United States Patent

[11] 3,604,621

[72] Inventor Walter S. Drummond, Jr.
4536 Santa Ana Street, Cudahy, Calif. 90201
[21] Appl. No. 7,602
[22] Filed Feb. 2, 1970
[45] Patented Sept. 14, 1971

[54] IMPROVED SLIDE RULE ARRANGEMENT
6 Claims, 6 Drawing Figs.
[52] U.S. Cl. .................................................... 235/70 R, 235/70 B
[51] Int. Cl. .................................................... G06g 1/02
[50] Field of Search ........................................... 235/70 R, 70 B

[56] References Cited
UNITED STATES PATENTS
1,014,344  1/1912  Smith .......................... 235/70 B
3,181,787  5/1965  Burns ........................... 235/78
FOREIGN PATENTS
598,633  10/1959  Italy ............................ 235/70 R
1,114,917  5/1968  Great Britain ................. 235/70 R Primary Examiner—Stephen J. Tomsky
Attorney—Finkelstein & Mueth

ABSTRACT: An improved slide rule arrangement having greater accuracy in reading the slide rule and information storage capability on the cursor of the slide rule as well as means for improving the ease with which the slide rule may be operated and adjusted is provided. The slide rule is of the type in which there is a top member coupled in spaced-apart relationship to a bottom member with a slide means slideably mounted intermediate the top member and bottom member and slideably moveable relative thereto. A cursor is mounted on the rule for sliding along the elongated length thereof and the cursor may have a magnifying indicator means on each face thereof and at least one extended planar surface extending therefrom upon which information such as formulas, tables of equivalents or the like may be imprinted or temporarily recorded. The planar surface may be permanently or detachably coupled to the cursor. The ends of the slide means, as well as portions of the cursor, may be provided with digit-engaging grooves and/or ridges to allow better gripping during movement thereof and also removable screws will be provided on cursor and body ends for possible readjustments. A permanent magnet may be included in the cursor and a strip of magnetic material for a cursor-runner may be provided on the top member or bottom member to obtain a preselected small restraining force for the cursor set in any position along the elongated length. There will also be the addition of a coating on the metal strip used to prevent or lessen static drag. The magnetic restraining force prevents small jarring forces from inadvertently moving the cursor and destroying the reading at a particular location. The different scales on the slide rule may be variably colored to aid in their reading and at least one linear scale is preferably included in which the divisions thereof are closely and equally spaced and the length of the division marks vary throughout the elongated length in a sinusoidal patter. The ends of the top member and bottom member may be oppositely offset from each other in the elongated length for more convenient handling.

INVENTOR
WALTER S. DRUMMOND, JR
BY
Finkelstein & Mueth
ATTORNEYS

INVENTOR
WALTER S. DRUMMOND, JR

IMPROVED SLIDE RULE ARRANGEMENT

BACKGROUND OF THE INVENTION

1. Field of the Invention

This invention pertains to the instrument art and more particularly to an improved slide rule arrangement.

2. Description of the Prior Art

General-purpose and special-purpose slides rules have been known for many years and have been utilized in innumerable applications in the technical and scientific professions. However, the slide rules available have not always been able to provide the comparative accuracy and ease in handling for operation that may be desired in various applications.

Accordingly, it is an object of applicant's invention herein to provide an improved slide rule arrangement.

It is another object of applicant's invention herein to provide a slide rule arrangement that is comparatively easier to handle, offers quick reference assistance, and provides a greater degree of accuracy in operation than presently available slide rules.

SUMMARY OF THE INVENTION

The above and other objects of applicant's invention are achieved, in accordance with the preferred embodiment thereof, by providing a slide rule in which there is an elongated top member and an elongated bottom member in spaced apart relationship. The front faces of each of the top member and bottom member comprise scale faces and are substantially coplanar. The backfaces thereof also comprise scale faces and are also substantially coplanar. The opposed inner surfaces of the top member and bottom member that are in spaced-apart relationship are adapted to receive the slide member in sliding relationship therewith and, for convenience, may be of the common tongue-and-groove type of sliding engagement.

The top and bottom members are held together in the spaced-apart relationship by two pairs of offset L-shaped members coupled to coupling portions at each end thereof. A first end of the top member extends outwardly past the second end of the bottom member and, conversely, at the opposite end of the elongated length thereof the first end of the bottom member extends outwardly past the second end of the top member so that the top member and bottom member are offset from each other.

A plurality of scales are provided on the front face and backface of the top and bottom member as desired and the scales may be of the conventional slide rule type of scales or special scales for special purpose slide rules depending upon the application. However, applicant prefers to have at least one scale on either the top or bottom member and either the front or backface thereof of a linear type in which the scale markers, which for example may be indentations photographically transferred or machine engraved on the slide rule, are adjacent to the outer edge of either the top member or bottom member and the lengths of the markers vary throughout the elongated length in a sinusoidal pattern.

The top member and bottom member are, of course, substantially parallel to each other and the L-shaped brackets maintain this parallel relationship.

A slide means is mounted intermediate the inner surface of the top member and the inner surface of the bottom member for sliding engagement therewith. The slide means has a front face substantially coplanar with the front faces of the top and bottom member and a backface substantially coplanar with the backfaces of the top and bottom member and the front face and backface of the slide means also comprise scale faces upon which there may be provided a plurality of scales.

The slide means in the preferred embodiment of applicant's invention has a length that is less than the distance from the first end of the top member to the first end of the bottom member so that when the slide means is centered on the top and bottom member the outer ends thereof are spaced inwardly from the first end of the top member and the first end of the bottom member. This preselected length helps prevent inadvertent movement of the slide means. Applicant prefers to provide grip portions on the ends of the slide and body means to provide a better grip when moving the slide. The grip portions may be on both the front face and backface and may, in the preferred embodiment of applicant's invention, be comprised of a plurality of substantially parallel grooves and ridges in a depression for accepting a digit such as a thumb or finger, or some other form of knurled or roughened surface to prevent slipping when the slide is moved.

A cursor means is slidably mounted on the coupled together top member and bottom member for relative movement with respect thereto. The cursor may be provided with a magnifying indicating means overlying the front face and/or the backface of the top member, bottom member and slide means and, in a preferred embodiment, is provided with one or more connecting portions. A planar extension means having an information surface overlies and extends outwardly from the cursor means and is coupled thereto. The coupling may be permanent or detachable as desired. Information in the form of formulas tables of equivalents, or like information as may be desired, may be imprinted either permanently or removably on the information surface. Further, it will be appreciated that one, two, three or four such planar extension means extending outwardly from each side of the front face and backface of the cursor means may be provided as desired for a particular application.

In order to hold the cursor in a particular position on the slide rule and also to allow accurate reading of the slide rule indication, applicant prefers to provide a permanent magnet in the cursor and a corresponding magnetic material strip for a cursor-runner extending throughout the length of one of the top or bottom member and in magnetic force relationship thereto to provide a preselected magnetic restraining force on the cursor. The force is sufficiently strong enough so that the cursor is not jarred loose inadvertently and the force is not large enough to inhibit the movement of the cursor as desired during operation of the slide rule. The application of a clear coating material applied to metal strip-runner will prevent static drag.

In other embodiments of applicant's invention the above-mentioned linear scale with equally spaced divisions may be provided adjacent the outer edges on the front face and backface of both the top member and bottom member on both sides. Further, gripping portions may also be provided on the cursor and the gripping portions on the cursor may be similar in structure to those described above for inclusion on the slide means. To provide convenient detachment means for the planar extensions there may be included, in other embodiments of applicant's invention, extended edge portions of the cursor extending outwardly from the outer edges of the top member and bottom member.

Figure 1:
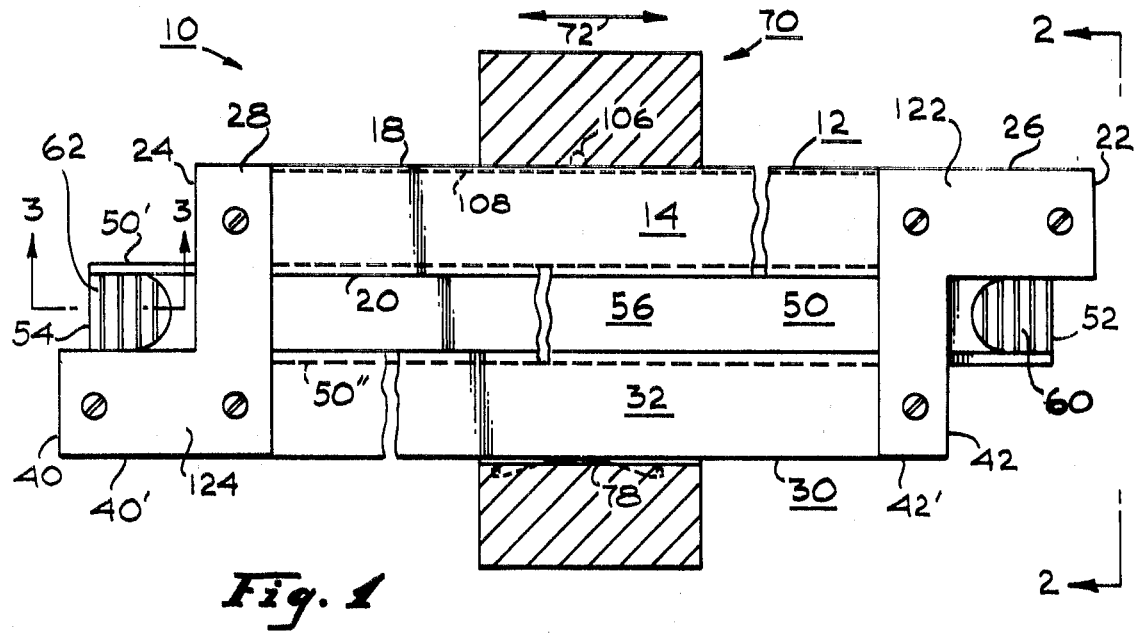
FIG. 1 is a front face view, partially in section, of one embodiment of applicant's invention of an improved slide rule.
Figure 2:
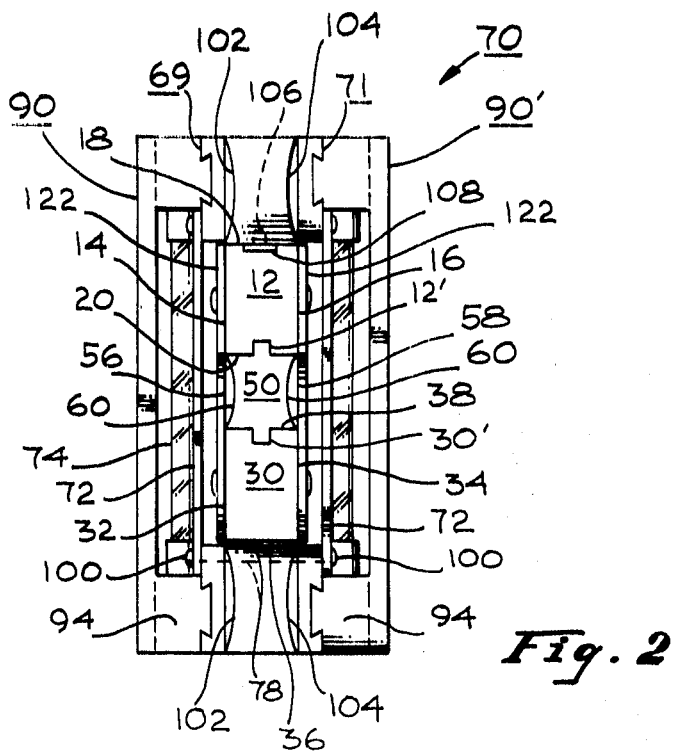
FIG. 2 is a view along the line 2—2 of FIG. 1.
Figure 3:
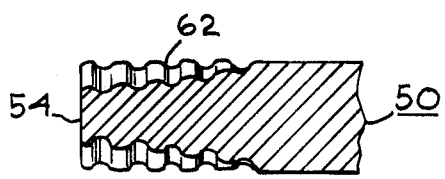
FIG. 3 is a sectional view along the section line 3—3 of FIG. 1 illustrating the gripping portion on the slide means.

Referring now to the drawings and in particular FIG. 1 and FIG. 3 there is shown a slide rule arrangement, generally designated 10, according to the principles of applicant's invention therein. As shown, the slide rule arrangement 10 is provided with an elongated top member 12 having a front face 14 and, as shown in FIG. 2, a backface 16. The front face 14 and backface 16 each comprise scale faces upon which there may be imprinted one or more scales of the particular kind or type desired for a particular application. The top member 12 has an outer surface 18 and an inner surface 20. The top member 12 also has a first end surface 22 and a spaced-apart second end surface 24. A first coupling portion 26 of the top member 12 is adjacent the first end surface 22 and a second coupling portion 28 of the top member 12 is adjacent the second end surface 24.

There is also provided a bottom member 30 having a front scale face 32 substantially coplanar with the front scale face 14 of the top member 12 and a back scale face 34 substantially coplanar with the back scale face 16 of the top member 12. The bottom member 30 also has an outer surface 36 and an inner surface 38. The inner surface 38 of the bottom member 30 is opposite and spaced apart from the inner surface 20 of the top member 12 and together provide slide means guiding surfaces which, for example, may be of the familiar tongue and groove arrangement as illustrated in FIGS. 1 and 2. That is, as seen more particularly in FIG. 2, groove 12' is provided in the top member 12 and groove 30' is provided in the bottom member 30 to accept matching tongues on the slide means 50.

The bottom member 30 also has a first end surface 40 spaced from the second end surface 24 of the top member 12 and also spaced outwardly therefrom, and a second end surface 42 spaced from the first end surface 22 of the top member 12. The first end surface 22 of the top member 12 is spaced outwardly from the second end surface 42 of the bottom member 30 to provide the top member 12 and the bottom member 30 in a spaced-apart, parallel but offset relationship.

A slide means 50 is provided with a first tongue member 50' for sliding engagement with the groove 12' in top member 12 and a second tongue member 50'' for sliding engagement with the groove 30' and bottom member 30. The slide means 50 has a length that is preselected to be less than the distance between the first end surface 40 of the bottom member 30 and first end surface 22 of the top member 12 so that when the slide means 50 is centered, as shown in FIG. 1, the first end 52 and second end 54 are spaced inwardly from the first end 22 of the top member 12 and the first end 40 of the bottom member 30, respectively.

The slide means 50 also has a front scale face 56 substantially coplanar with the front scale faces 14 and 32, and a back scale face 58 substantially coplanar with the back scale faces 16 and 34 of the top member 12 and bottom member 30, respectively.

The slide means 50 may, in the preferred embodiments of applicant's invention, be provided with a first gripping portion 60 adjacent the first end 52 thereof and a second gripping portion 62 adjacent the second end 54 thereof and, as shown in FIGS. 1 and 2, the gripping portions 60 and 62 may be provided on both the front face 6 and backface 58 of the slide means 50 and may comprise depression for convenient engagement with a digit such as the thumb or finger and the depression may be provided with a plurality of grooves. This may be seen more clearly in FIG. 3.

The slide means 50 may, of course, be provided with one or more scales as desired on the front scale face 56 and back scale face 58 thereof.

A cursor means 70 is slidably mounted on the top member 12 and bottom member 30 for relative movement in directions indicated by the double-ended arrow 72 thereto.

Figure 5:
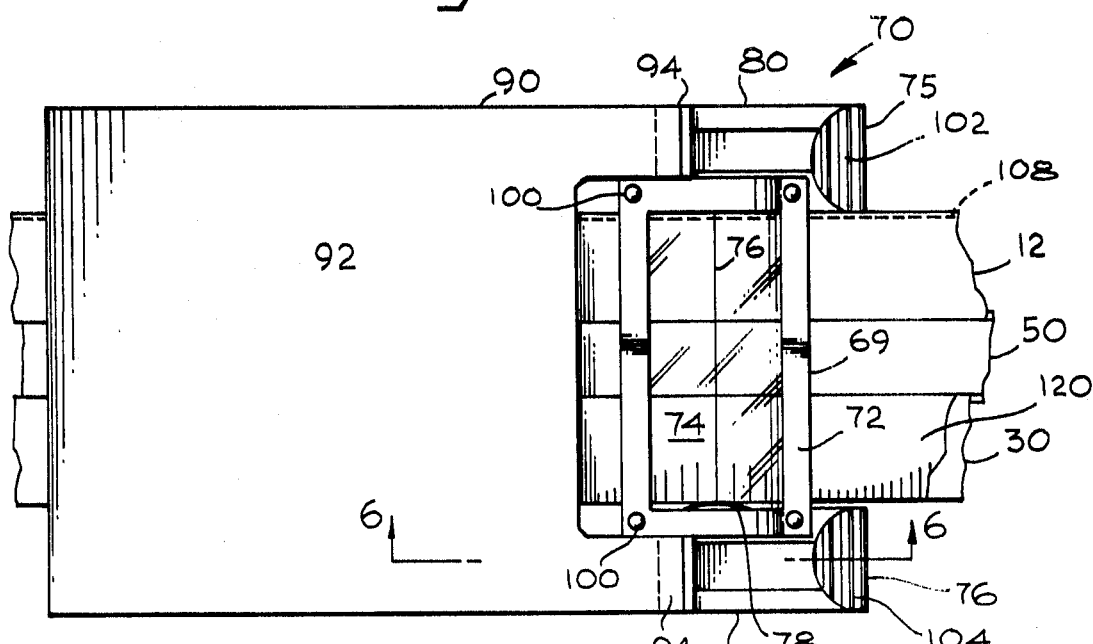
FIGS. 5 and 6 illustrate a cursor according to the principles of applicant's invention herein.
Figure 6:
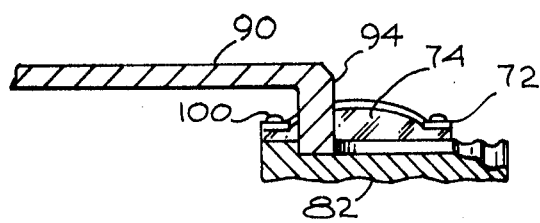

FIGS. 2, 5 and 6 illustrate in detail the preferred arrangement of a cursor according to the principals of applicant's invention herein. The cursor 70 shown thereon has substantially identical front face 69 and backface 71 and as shown in FIG. 5 is provided with a front frame member 72 holding an indicating means 74 in overlying relationship to the front scale faces 14, 32 and 56 of the top member, bottom member and slide means respectively. A hairline 76 may be provided with the indicating means 74 and, if desired, the indicating means 74 may be a magnifying indicating means, as shown, to allow more convenient reading of the scales. It will be appreciated that a back frame means on the backface 71 of the cursor 70 is substantially identical to the front frame 72 and front face 69.

In the embodiment of applicant's invention shown in the drawings the cursor 70 also has a top edge portion 75 and a bottom edge portion 76. The top edge portion 75 is in sliding engagement with the outer edge 18 of the top member 12. The bottom edge portion 76 is provided with a leaf spring 78 that resiliently mounts the cursor 70. The leaf spring 78 is sliding engagement with the outer surface 36 of the bottom member 30 of the slide rule 10.

The edge portions 75 and 76 may be provided with connecting portions 80 and 82, respectively, for connection to a planar extension means 90. The planar extension means 90 has an information surface 92 overlying the front face of the upper member 12, lower member 30 and slide means 50 and is spaced a preselected distance therefrom. The planar extension means 90 also has leg means 94 for coupling to the coupling portions 80 and 82. The coupling of the planar extension means 90 may be permanent or it may be a detachable coupling as illustrated in FIGS. 5 and 6 wherein there is shown a frictional retention tongue and groove arrangement for detachably coupling planar extension means 90 to the cursor 70.

Screw means 100 may be utilized to hold the frame 72 to the edge portions 75 and 76.

The cursor 70 may also be provided with gripping portions 102 on the edge portion 74 and gripping portions 104 on the edge portion 76 and these gripping portions may be on both the front face and backface thereof and may be similar to the gripping portions 60 and 62 provided on the slide 50 as described above.

In the preferred embodiment of applicant's invention the cursor 70 is restrained by a preselected force when in any desired position along the elongated length of the upper member 12 and bottom member 30. The preselected force is small enough so that it does not interfere with convenient movement of the cursor 70 but is sufficiently strong enough to prevent the cursor from inadvertent movement due to shocks and jars. To achieve this force, applicant prefers to utilize magnetic force and in one embodiment of applicant's invention as illustrated in FIG. 2, there is a permanent magnet 106 in the cursor 70 and, as shown on FIG. 2, the permanent magnet 106 is adjacent the outer edge 18 of the top member 12. Embedded within the top member 12 in magnetic field relationship to the permanent magnet 106 is an elongated strip of magnetic material 108 extending throughout the length of the top member 12 from the first end 22 to the second end 24 thereof. Thus, the cursor 70 while still free to slide in the directions indicated by the arrow 72 is nevertheless restrained when forces moving the cursor 70 are removed. The amount of magnetic force can be selected as desired for a particular application.

It will be appreciated that other embodiments of applicant's invention may incorporate a magnetic leaf spring 78 and a conveniently mounted strip portion in magnetic field relationship to the leaf spring 78 embedded in the bottom member 30, or other magnetic material means.

It will be appreciated that grooves and ridges provided in the gripping portions 60 and 62 of the slide means 50 and/or in the gripping portions 102 and 104 of the cursor 70 are not sharp but are rounded to prevent injury to the user.

Further, additional planar extension means such as 90' may be similar to the planar extension means 90 and may be permanently or detachably coupled to the cursor 70 for extension towards the first end 22 and/or the second end 24 of the top member 12 and overlying the front face 14 and/or the backface 16 thereof as desired. Similarly, such planar extensions will also overlie the slide means 50 and the front face 32 and backface 34 of the lower member 30.

Figure 4:
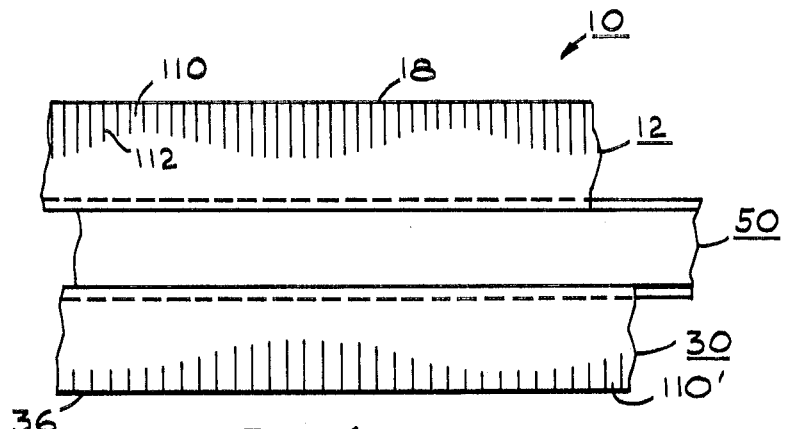
FIG. 4 is an enlarged view of a portion of a slide rule according to the principle's of applicant's invention herein.

For convenience, there may be provided variations in the color of the scales on the scale faces to allow for easier reading. Applicant prefers to include at least one linear scale with equally spaced markings and preferably such a scale is adjacent the outer edge 18 and/or the outer edge 36 of the top member 12 and bottom member 30, respectively. FIG. 4 is an enlarged view of a section of the embodiment 10 shown in FIGS. 1 and 2 and as shown thereon there is a linear scale 110 with a plurality of equally spaced marking divisions 113 on the top member 12 and adjacent the outer surface 18. The length of the markings 112 comprising the linear scale 110 are, according to the principals of applicant's invention, varied in a periodically repetitive sinusoidal manner as shown. The markings 112 may be machine engraved for accuracy and filled with magnetic material such as iron filings for an alternate magnetic attraction. A similar linear scale 110' which may be the same as the linear scale 110, or may have its equally spaced markings at different intervals, is provided by the bottom member 30 adjacent the outer surface 36 thereof. Such scales as linear scales 110 and 110' may also be provided on the back faces 16 and 34 of the top member 12 and bottom member 30, respectively.

FIG. 2 shows the cursor 70 provided with two planar extension means 90 and 90', one coupled to the cursor means 70 and spaced apart from the front faces and one coupled to the cursor means 70 and spaced apart from the backfaces.

The top member 12 and bottom 30 are maintained in their spaced-apart, parallel, offset relationship by a first and second pair of substantially identical L-shaped coupling brackets 122 and 124. All four of the L-shaped coupling brackets are substantially identical. The first pair of coupling brackets 122 are coupled to the first coupling portion 26 of the top member 12 and to the second coupling portion 42' of the bottom member 30 which is adjacent the second end surface 42. Similarly, the second pair of L-shaped coupling brackets 124 are coupled to the second coupling portion 28 of the top member 12 and to the first coupling portion 40' of the bottom member 30.

In order to prevent scratching and provide easier operation and manipulation, it may be desired to provide a coating of hard plastic, such as the coating 120 shown in fragmentary view on FIG. 5, on one or more sides of the slide rule 10 and/or the cursor 70.

This concludes the description of applicant's invention of his improved slide rule arrangement. Those skilled in the art may find many variations and adaptations of applicant's invention and the following claims are intended to cover all such variations and adaptations falling within the true scope and spirit hereof.

What is claimed is new and desired to be secured by Letters Patent of the United states is:

1. An improved slide rule comprising, in combination:
   an elongated top member having a front scale face, a back scale face, an outer surface, an inner surface spaced from said outer surface, a first end surface, a second end surface spaced from said first end surface a preselected elongated length, a first coupling portion adjacent said first end surface and a second coupling portion adjacent said second end surface;
   an elongated bottom member spaced a preselected distance from said top member and substantially equal in length and parallel thereto, and having a front scale face substantially coplanar with said front scale face of said top member, a back scale face substantially coplanar with said back scale face of said top member, an inner surface opposite said inner surface of said top member, an outer surface spaced apart from said inner surface, a first end surface spaced apart from said second end surface of said top member, a second end surface spaced apart from said first end surface of said top member, and said first end surface of said bottom member, and said first end surface of said bottom member extending outwardly past said first end surface of said top member;
   said top and said bottom inner surfaces comprising slide-member-guiding surfaces, said top member and said bottom member outer surfaces comprising cursor-guiding surfaces;
   said top member front scale face and said top member back scale face and said bottom member front scale face and said bottom member back scale face having a plurality of scales thereon, and at least one of said scales on one of said top member and said bottom member comprising a linear scale having a plurality of equally spaced-apart scale markers extending a predetermined distance between said outer surface and said inner surface, and said predetermined distance varying sinusoidally throughout the elongated length;
   a first and a second pair of substantially identical L-shaped coupling brackets for maintaining said top member and said bottom member in said preselected spaced-apart and parallel alignment and said first pair of coupling brackets coupled to said first coupling portion of said top member and to said second coupling portion of said bottom member, and said second pair of coupling brackets coupled to said second coupling portion of said top member and to said first coupling portion of said bottom member;
   a slide means mounted intermediate said inner surface of said top member and said inner surface of said bottom member and in sliding engagement therewith for sliding movement relative to said top member and said bottom member, and said slide means having a predetermined length and said slide means predetermined length a preselected amount less than the distance between said top member first end surface and said bottom member first end surface, and said slide having a first grip portion adjacent a first end thereof and a second grip portion adjacent a second end thereof, and said slide member having a front scale face substantially coplanar with said top member front scale face and said bottom member front scale face, and said slide member having a back scale face substantially coplanar with said top member back scale face and said bottom member back scale face, and at least one scale on said front scale face and at least one scale on said back scale face;
   a cursor means slidably mounted on said top member and said bottom member for relative movement with respect thereto and having a front frame means overlying said front scale face of said top member, said bottom member and said slide member, and a back frame means overlying said back scale face of said top member, said bottom member and said slide member, and each of said front and said back frame means having an indicating means for indicating the relative position of said slide member with respect to said top member and said bottom member, and at least one of said front frame means and said back frame means has at least one connecting portion thereon, and said cursor means having a permanent magnet attached thereto;
   one of said top member, bottom member and slide member having a substantially continuous strip magnetic member extending throughout substantially all of said elongated length thereof and in magnetic-field-attracting relationship to said permanent magnet in said cursor for providing a preselected restraining force on said cursor at all points throughout said elongated length; and
   at least one planar extension means having an information surface overlying and spaced a preselected distance from said front scale faces of said top member, said slide member and said bottom member, and said planar extension means having a leg portion coupled to said connecting portion of said cursor 2. The arrangement defined in claim 1 wherein:
   said first grip portion of said slide means has a plurality of grooves and ridges on said front scale face and said back scale face, and said second griping portion on said slide means has a plurality of grooves and ridges thereon on said front scale face and said back scale face thereof;
   said at least one planar extension means is detachably coupled to said cursor means; and
   said scales have preselected color variations therebetween.

3. The arrangement defined in claim 2 wherein:
   each of said front scale face and said back scale face of said top member and said front scale face and said back scale face of said bottom member have said linear scale thereon and each of said linear scales is adjacent said outer surface of said respective top member and said bottom member;

three additional planar extension means substantially identical to said at least one planar extension means and each of said three additional extension means detachably coupled to said cursor in a preselected array;

said cursor has a leaf spring thereon for sliding engagement with one of said outer surface of said top member and said bottom member and outer leaf spring means providing resilient mounting of said cursor thereon;

and said continuous strip magnetic member is mounted adjacent one of said top member and bottom member.

4. The arrangement defined in claim 2 wherein:

each of said front scale face and said back scale face of said top member and said front scale face and said back scale face of said bottom member have said linear scale thereon and each of said linear scales is adjacent said outer surface of said respective top member and said bottom member;

three additional planar extension means substantially identical to said at least one planar extension means and each of said three additional extension means detachably coupled to said cursor in a preselected array;

said cursor has a leaf spring thereon for sliding engagement with one of said outer surface of said top member and said bottom member and said leaf spring means providing resilient mounting of said cursor thereon: and at least one of said scales on said scale faces has magnetic material impressed therein.

5. The arrangement defined in claim 3 wherein:

said cursor has a front face gripping portion on said front face thereof provided with a plurality of grooves and ridges therein and a backface gripping portion on the backface thereof and said backface gripping portion provided with a plurality of grooves and ridges therein;

and said indicating means on said front frame and said back frame of said cursor means is a magnifying indicating means.

6. The arrangement defined in claim 5 wherein:

said front frame and said back frame of said cursor further comprise edge members extending outwardly from said outer surface of said top member and said outer surface of said bottom member, and said connecting portion of said cursor means on said edge portions, and said detachable connection between said cursor means and said planar extension means comprising a plurality of frictionally engaging matching tongue and groove elements on said connecting portion of said cursor means and said leg portion of said planar extension means for detachable frictional engagement therewith; and a coating means for surface protection on one of said front scale face and said back scale face of said top member and said bottom member and on predetermined surfaces of said cursor.